July 31, 1934.   G. M. REED   1,968,619

ELECTRICAL SWITCH GEAR

Filed July 30, 1932

Inventor:
George M. Reed,
by Charles E. Tullar
His Attorney.

Patented July 31, 1934

1,968,619

UNITED STATES PATENT OFFICE 1,968,619

ELECTRICAL SWITCH GEAR

George M. Reed, Yeadon, Pa., assignor to General Electric Company, a corporation of New York Application July 30, 1932, Serial No. 626,621

5 Claims. (Cl. 175—298)

My invention relates to electrical switchgear, more particularly to switchgear comprising busbars and circuit controlling apparatus including disconnecting switches for connecting an outgoing or feeder circuit to said busbars.

In metal enclosed switchgear of the aforesaid type, for example, it is common practice to mount within the lower part of a cubicle a circuit breaker which is connected to busbars in the upper part of the cubicle by means of conductors and disconnecting switches. The conductors and disconnecting switches are generally supported by and mounted on insulating supports and bushings within the cubicle, as is the operating means for the disconnecting switches, so that an appreciable space factor is involved in the entire cubicle assembly.

A principal object of my invention is the provision of improved switchgear which shall be simple and compact in construction, and which may be fabricated and assembled at comparatively low cost.

My invention will be more fully set forth in the following description referring to the accompanying drawing, and the features of novelty which characterize my invention will be pointed out with particularity in the claims annexed to and forming a part of this specification.

Figure 1:
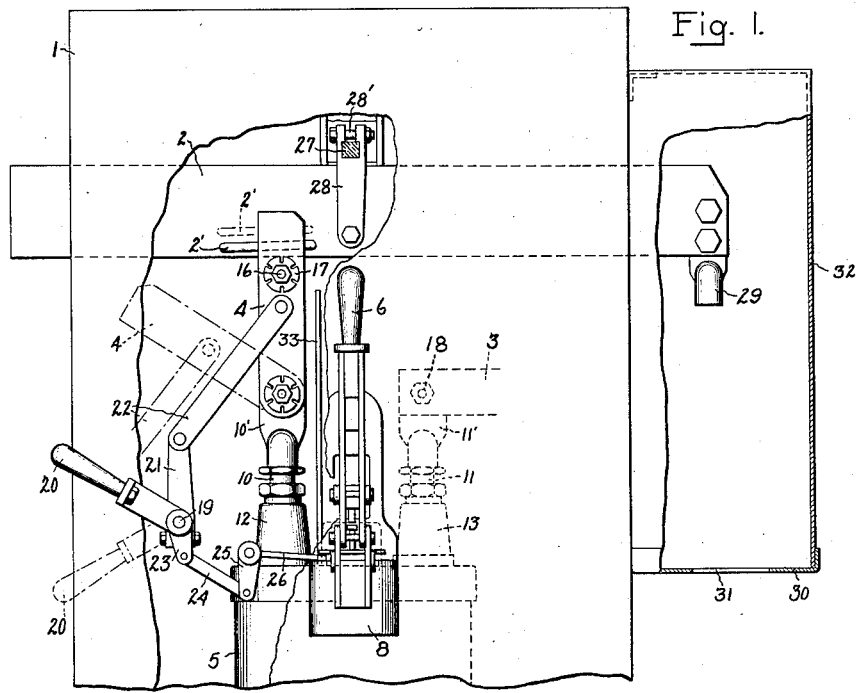
Figure 2:
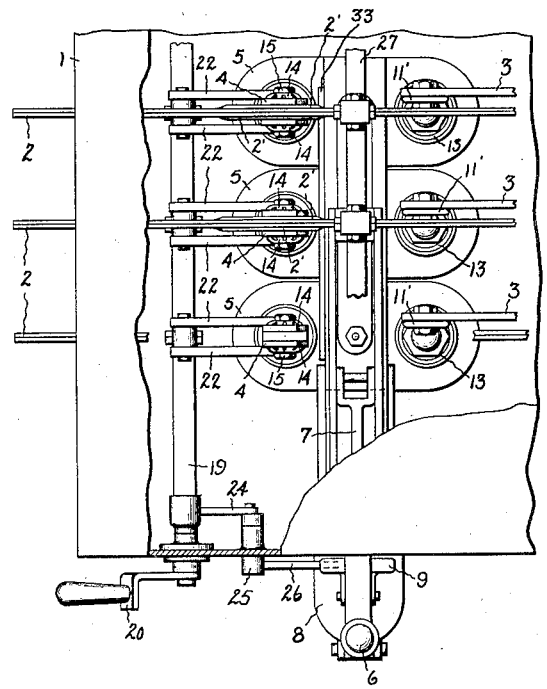

Referring to the drawing, Fig. 1 is a fragmentary elevational view, partly in section, of electrical switchgear embodying my invention and Fig. 2 is a fragmentary plan view of apparatus shown in Fig. 1.

The electrical switchgear shown is of the cubicle type and comprises an enclosing metallic housing 1 for the individual phase busbars 2 which energize the outgoing or feeder conductors 3 through the disconnecting switches 4 and circuit breakers 5. It shall be understood of course that the cubicle structure may be of masonry or the like, or an open framework structure may be used. The general arrangement above described is well known, the busbars which comprise flat conducting strips being suitably energized so that when the circuit breakers 5 and disconnecting switches 4 are in closed circuit position the outgoing feeder or incoming line branch circuits are supplied with electrical energy.

The circuit breakers 5 may be of any suitable type, oil circuit breakers being illustrated in the present instance, and are equipped with suitable operating mechanism, as the hand lever 6 mounted exteriorly of the cubicle housing and connected to the individual breakers by an operating rod 7. Since the operating mechanism forms no part of the present invention, further description is believed unnecessary other than to point out that the mechanism is closed manually by the lever 6 and may be tripped open by the usual overload or tripping magnet 8. The magnet 8 actuates a pivoted armature 9, causing tripping of toggle mechanism (not shown) so that the circuit breakers move to open position. The breakers, which are shown as of the single phase type, one breaker for each phase, are each provided with terminal conductor studs 10 and 11 mounted in the insulating bushings 12 and 13 respectively, the terminal studs extending within the breaker tank and connected to the oil immersed contacts in a well known manner.

For the purpose of producing a compact and inexpensive cubicle design and reducing the overall height, the circuit breakers and busbars 2 are interconnected by a minimum of conducting parts while including the disconnecting feature. To this end each phase disconnecting switch 4 is directly mounted on the flanged portion 10' of the breaker terminal stud 10 so as directly to engage and make contact with the corresponding busbar 2. In other words, the busbar itself forms the stationary contact of the disconnecting switch arrangement. It shall be understood that the disconnecting switch may be mounted in different ways to accomplish the same general result. For example, the disconnecting switch may be pivotally mounted on the busbar to make contact with the terminal stud portion 10' or the pivotal mounting may be at the center of the switch so that the opposite ends of the switch make contact with the terminal stud and busbar respectively. In any event, the disconnecting switch makes direct contact with the busbar itself.

Referring more specifically to the disconnecting switch structure, each switch comprises a pair of blades which are clamped in the present instance to opposite sides of the pivotal support 10' as by a pair of spring washers 14 mounted on the pivot pin 15. For the purpose of increasing the current carrying capacity at the pivotal connection, either the portion 10' or the blades may be provided with swedged or raised portions so as to provide substantially line or point contact between the relatively movable conductors. By greatly increasing the contact pressure per unit of contact area, the current carrying capacity is materially increased.

The free ends of the disconnecting switch blades are likewise interconnected by a spacing pin 16 and pressed towards each other by the resilient washers 17 so that in the closed circuit position, when the busbar 2 is clasped by and between the blades of the disconnecting switch, the contact pressure will be sufficient for the required current carrying capacity. As in the case of the pivotal connection, the current carrying capacity between the disconnecting switch blades and the busbar is increased by swedging either the busbar or the disconnecting switch blades so as to form substantially line contact. In the present instance the busbar which is composed of two strips is swedged as at 2, one swedging for each strip, so that raised portions or ridges extend along opposite sides of the busbar at the contact area engaged by the blades of the disconnecting switch in the closed circuit position. The number of busbar strips and disconnecting switch blades, i. e., the cross section of copper, may be increased depending on the required ampere capacity of the apparatus. In order further to increase the current carrying capacity and to reduce heating, the coacting contact surfaces of the busbar and disconnecting switch are electro-plated with a silver deposit.

It will be understood, of course, that where a single heavy busbar strip is used, the disconnecting switch blades themselves may be swedged or provided with raised portions so that the high pressure line contact is obtained.

Accordingly, it will be noted that the connection between the busbar and circuit breaker terminal stud 10 is as direct as possible with the use of a disconnecting switch and that there is a negligible heating loss as compared with the usual number of joints and other fittings heretofore interconnecting the busbar and breaker. The simplified arrangement is completed by the conductor strip of the feeder circuit conductor 3 which is connected directly at 18 to the flanged portion 11' of the opposite terminal stud 11.

The disconnecting switches 4 are preferably gang operated, the present arrangement comprising a main operating shaft 19 journaled in the cubicle housing 1 and connected exteriorly of the housing to the manually operable arm 20. Spaced along the shaft 19 opposite the corresponding disconnecting switches are the cranks 21 which are connected, as by an intermediate insulating link 22, to the disconnecting switch so that, as viewed in Fig. 1, counter-clockwise rotation of the arm 20 causes opening of the disconnecting switches and clockwise rotation causes closing of the disconnecting switches. In order to prevent improper operation of the disconnecting switches with respect to the circuit breaker, a lug 23 secured to the operating shaft 19 is connected through a link 24 to a bellcrank 25 which is pivotally mounted on the front wall of the cubicle housing. The crank 25 is provided with an arm 26 arranged so as to extend beneath the tripping armature 9 and to trip open the circuit breakers in the event that the disconnecting switches are opened in improper order. Likewise, the tripping armature is held in such position when the disconnecting switches are open that the disconnecting switches must be closed before the oil breakers are closed. Therefore, the disconnecting switches are not subject to the burning action of opening or closing on heavy currents.

The busbars 2 are mounted in the upper part of the structure or cubicle housing and are insulated therefrom in any suitable manner, the arrangement shown wherein the busbars are suspended from an insulated crossbar or rod 27 being preferred. The rod 27 is of laminated wood which, in addition to being good insulating material, is mechanically strong, and is supported at opposite sides of the cubicle housing. Spaced along the rod 27 are the depending clamps 28 which are secured to and support the busbars. The clamps 28 may be adjusted as by bolts 28' along the rod so as properly to align the busbars with respect to the disconnecting switch blades.

The switchgear above described is of the unit type, each unit including the circuit interrupting switching arrangement for a single outgoing circuit. Where a number of circuits are to be energized from the busbars a plurality of similar units are arranged side by side, the busbars extending from one unit as shown in the drawing so as to connect with the busbar sections in the adjacent units. The conductors energizing the busbars are connected thereto at the busbar terminal connections 29, said connections being housed in an extension of the main cubicle housing. This extension comprises a shelf-like member 30 suitably secured to the housing 1 as by riveting or welding and provided with an opening 31 for receiving the incoming conductors. A cover member 32 is detachably secured in position so as to complete with the lower shelf 30 the extension housing for the incoming bus connections. The cover member 32 is preferably detachable so that access to the bus connections may be had readily.

Under certain operating conditions it may be advisable to insert an insulating partition, as at 33, between the breaker terminals. In the present instance the partition comprises a sheet of insulating compound mounted between the terminal studs so as to separate the disconnecting switch and outgoing feeder circuit. If desired, a sheet of similar insulating material may be disposed between the disconnecting switches and the busbars when the disconnecting switches are in open circuit position, thereby precluding any chance of flashover between the live bus and the disconnecting switches particularly when the circuit breaker is being inspected or repaired.

The above described switchgear, by the elimination of insulating supports, conductors and electrical connections as joints, welds, etc., is comparatively compact in design, and due to the simplicity of the connections is efficient in operation while providing the required circuit protection.

It should be understood that my invention is not limited to specific details of construction and arrangement thereof herein illustrated, and that changes and modifications may occur to one skilled in the art without departing from the spirit of my invention.

What I claim as new and desire to secure by Letters Patent in the United States is:

1. In switchgear including a busbar and a circuit breaker, disconnecting means comprising a pair of blades directly connected to one terminal of said breaker and pivotally mounted so as to clasp and engage said busbar at opposite sides thereof.

2. In metal enclosed switchgear including a busbar and a circuit breaker, disconnecting means for isolating said breaker with respect to said busbar comprising a pair of blades pivotally mounted on and electrically connected to a terminal stud of said breaker, said blades extending along opposite sides of said busbar so as to clasp and engage the same in the connected position.

3. In switchgear including a busbar and a feeder or incoming line circuit which is to receive electrical energy from said busbar, a disconnecting switch between said busbar and feeder circuit comprising a pair of blades pivotally mounted so as to clasp and engage said busbar at opposite sides in the connected position, the busbar serving as a stationary contact of the disconnecting switch and said blades serving as the movable contact, one of said contacts having a raised portion so as to increase the pressure per unit contact area when said contacts are in the connected position.

4. In metal enclosed switchgear including a busbar and a circuit breaker, a disconnecting switch between said breaker and busbar comprising a pair of blades pivotally mounted on one terminal of said breaker so as to engage opposite sides of said busbar, said busbar having raised portions at the point of contact with said blades so as to insure high pressure per unit contact area.

5. A metal enclosed switchgear unit comprising a metallic housing forming a cubicle, a plurality of busbar sections mounted in said cubicle in parallel relation, disconnecting switching means disposed beneath and directly related to each busbar section and means mounting said busbar sections within said cubicle comprising an insulating rod extending transversely of and mounted in said cubicle, and a supporting clamp depending from and adjustable longitudinally of said insulating rod for each of said busbar sections so that each of said sections may be properly alined with respect to said coacting disconnecting switching means.

GEORGE M. REED.